(12) United States Patent
Aburmad

(10) Patent No.: US 8,830,601 B2
(45) Date of Patent: Sep. 9, 2014

(54) OPTICAL ARRANGEMENT WITH TEMPERATURE COMPENSATION FOR FOCAL LENGTH CHANGES

(71) Applicant: Opgal Optronic Industries Ltd., Karmiel (IL)

(72) Inventor: Shimon Aburmad, Nahariya (IL)

(73) Assignee: Opgal Optronic Industries Ltd., Karmiel (IL)

( * ) Notice: Subject to any disclaimer, the term of this patent is extended or adjusted under 35 U.S.C. 154(b) by 0 days.

(21) Appl. No.: 13/723,644

(22) Filed: Dec. 21, 2012

(65) Prior Publication Data

US 2013/0163104 A1 Jun. 27, 2013

(30) Foreign Application Priority Data

Dec. 22, 2011 (IL) .......................................... 217165

(51) Int. Cl.
*G02B 7/02* (2006.01)
(52) U.S. Cl.
USPC .......................................... 359/820; 359/822
(58) Field of Classification Search
USPC .................. 359/694–704, 811–830
See application file for complete search history.

(56) References Cited

U.S. PATENT DOCUMENTS 5,313,333 A * 5/1994 O'Brien et al. ................ 359/820
5,701,191 A * 12/1997 Iwasaki ....................... 359/205.1

* cited by examiner

*Primary Examiner* — Mohammed Hasan
(74) *Attorney, Agent, or Firm* — Pearl Cohen Zedek Latzer Baratz LLP

(57) ABSTRACT

An optical instrument with temperature-related focal length variations compensation mechanism is provided herein. The optical instrument includes: a housing within a bore of the optical instrument, wherein the bore and the housing have each a distal end and a proximal end; a set of lenses located on a common optical axis and affixed within the housing, wherein the set of lenses is associated with a specified focal length for each specified temperature; and a temperature compensation member connecting the distal end of the housing to the distal end of the bore of the optical instrument, wherein the temperature compensation member comprises one or more sections whose thermal expansion coefficient and length along the optical axis are selected such that for a specified range of temperatures, the expansion of the temperature compensation member along the optical axis compensates for a change of the focal length of the lenses.

11 Claims, 3 Drawing Sheets

OPTICAL ARRANGEMENT WITH TEMPERATURE COMPENSATION FOR FOCAL LENGTH CHANGES

CROSS-REFERENCE TO RELATED APPLICATIONS

This application is a non-provisional application claiming priority from Israeli Patent Application No. 217165, filed Dec. 22, 2011, which is incorporated herein in its entirety.

BACKGROUND

1. Technical Field

The present invention relates to optical instruments and more particularly, to optical instruments with temperature compensation mechanism for focal length variations.

2. Discussion of the Related Art

Optical instruments tend to suffer from focal length variation due to changes in the temperature of the ambient. This is usually because the optical indices of the lenses tend to change over temperature. Additionally, the geometry of the lenses may further change due to temperature variation and so does the focal length of the set of lenses.

Several solutions for the temperature-related focal length variation problem are known in the art. FIG. 1 shows one such solution, in which optical instrument 10 includes, for example, one set of lenses 20A-20F within optical instrument 10 that has an image sensor 60 affixed thereto. Lenses 20A-20F are all affixed to identical members of temperature compensation 50A and 50B. Temperature compensation members 50A and 50B may be comprised each of two or more portions of different materials selected due to their respective temperature expansion coefficient. Specifically, the length of each one of the portions and the materials are selected so that the any change in the focal length of optical instrument 10 due to changes in the geometry of lenses 20A-20F due to temperature change is compensated by the expansion of temperature compensation members 50A and 50B. In this manner, within a range of temperatures, the effective focal length of optical instrument 10 remains the same.

BRIEF SUMMARY

One aspect of the invention provides an optical instrument with temperature-related focal length variations compensation mechanism. The optical instrument includes: a housing within a bore of the optical instrument, wherein the bore and the housing have each a distal end and a proximal end; a set of lenses located on a common optical axis and affixed within the housing, wherein the set of lenses is associated with a specified focal length for each specified temperature; and a temperature compensation member connecting the distal end of the housing to the distal end of the bore of the optical instrument, wherein the temperature compensation member comprises two or more sections whose (i) thermal expansion coefficient and (ii) length along the optical axis are selected such that for a specified range of temperatures, the expansion of the temperature compensation member along the optical axis compensates an increase of the focal length of the set of lenses.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

Figure 1:
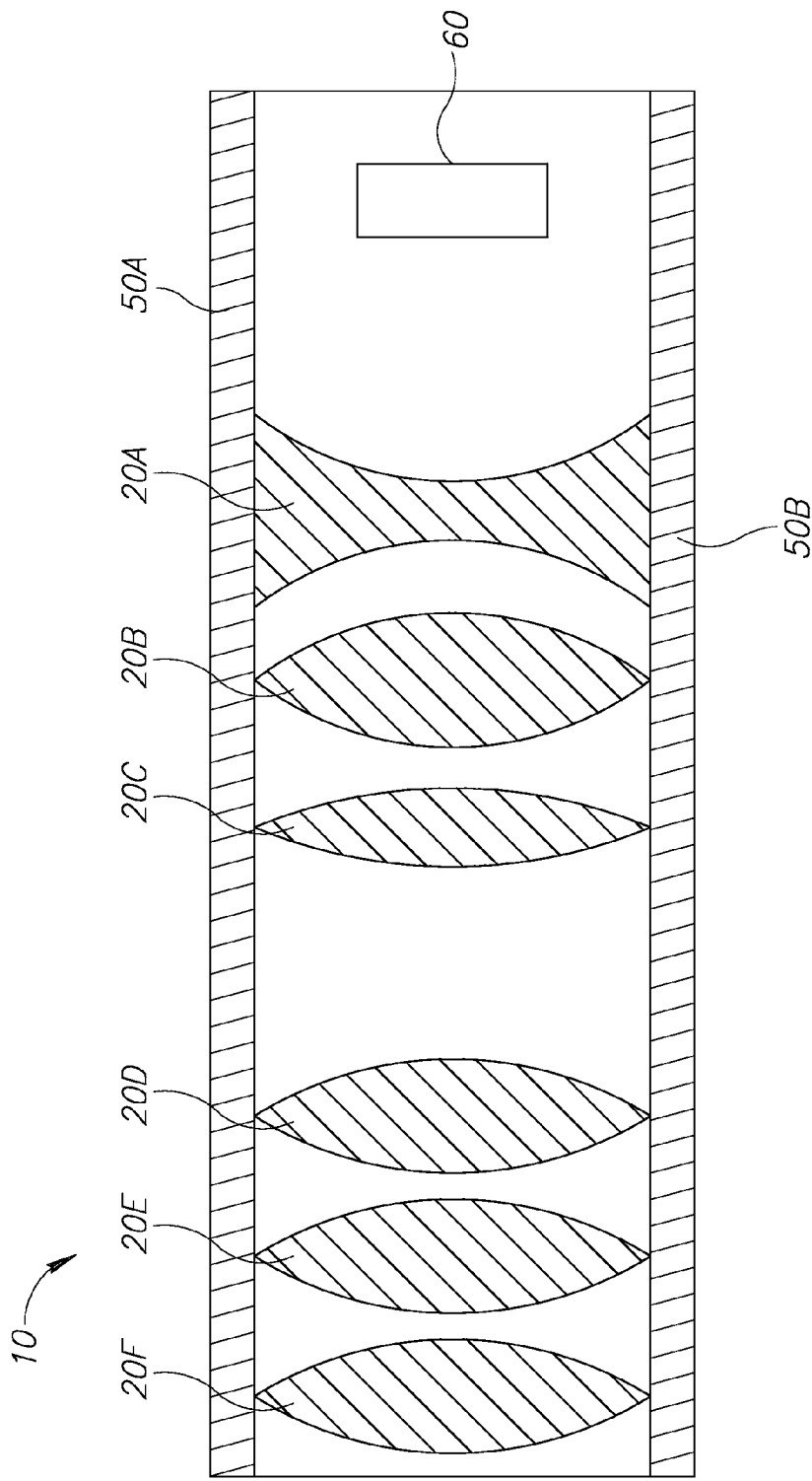
FIG. 1 is a schematic diagram illustrating an optical instrument according to the existing art.

The drawings together with the following detailed description make apparent to those skilled in the art how the invention may be embodied in practice.

DETAILED DESCRIPTION

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 2:
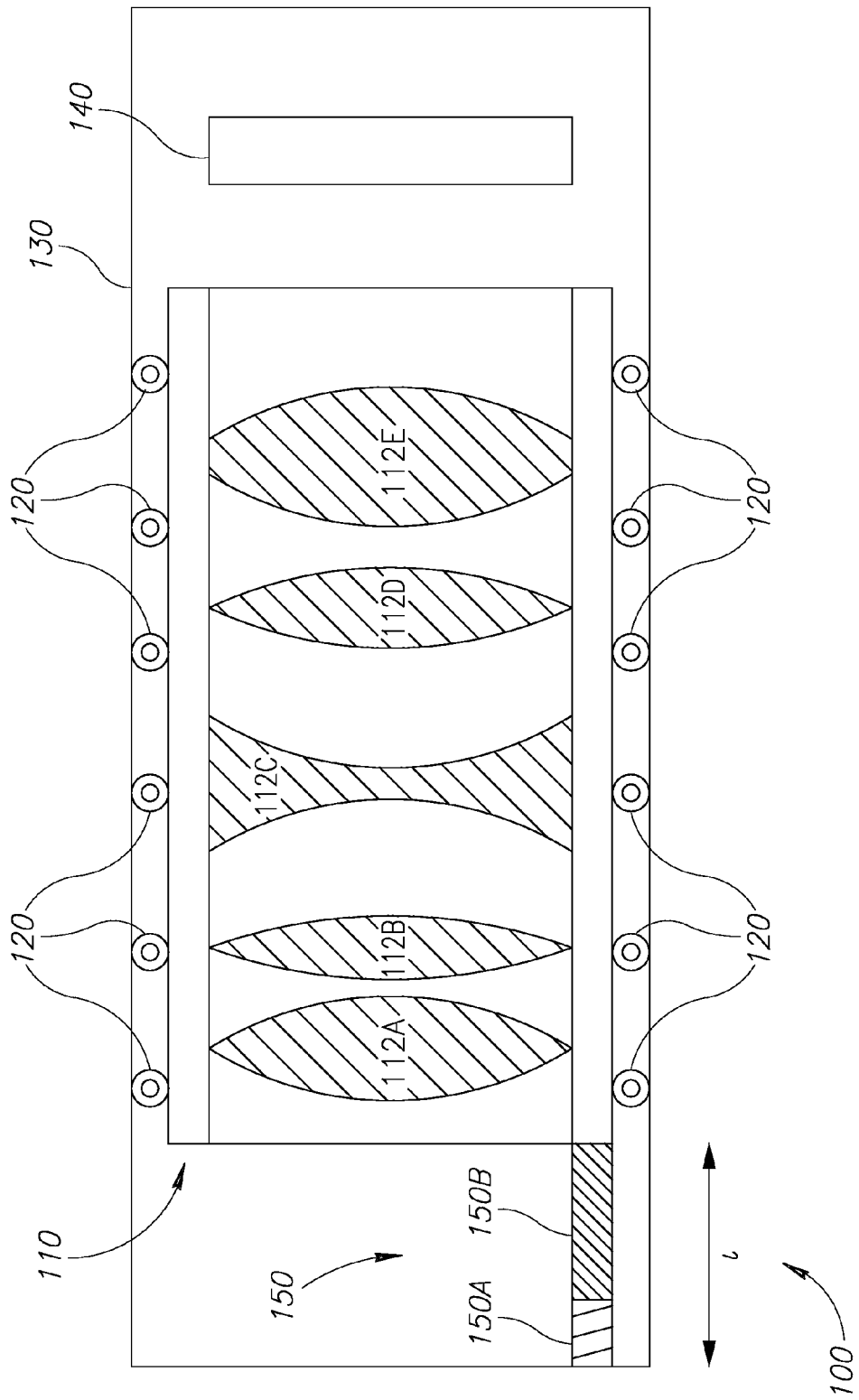
FIG. 2 is a schematic diagram illustrating an improved optical instrument according to some embodiments of the present invention.

FIG. 2 shows an optical instrument with temperature-related focal length variations compensation mechanism. Optical instrument 100 includes: a housing 110 within a bore of optical instrument 100, wherein the bore and the housing have each a distal end and a proximal end. Optical instrument 100 further includes a set of lenses 112A-112E located on a common optical axis and affixed within housing 110. Specifically, set of lenses 112A-112E is associated with a specified focal length for each specified temperature. Optical instrument 100 further includes a temperature compensation member 150 connecting the distal end of housing 110 to the distal end of the bore of the optical instrument 100.

Specifically, temperature compensation member 150 comprises two or more sections (e.g., 150A and 150B) whose (i) thermal expansion coefficient and (ii) length along the optical axis are selected such that for a specified range of temperatures, the expansion of temperature compensation member 150 along the optical axis compensates an increase of the focal length of the set of lenses 112A-112E.

The inventor has discovered, based on a series of experimentations, that for a specific set of lenses 112A-112E, optimal results for temperature compensation were achieved in a case in which one section (e.g., 150A) of the temperature compensation member was made of aluminum and another section (e.g., 150B) of temperature compensation member 150 was made of the ULTEM amorphous thermoplastic polyetherimide (PEI) material. It has been discovered that the combination of these two materials each having different thermal expansion coefficient yields, in carefully selected length, an average thermal expansion coefficient that corresponds with the change in the focal length of the set of lenses 112A-112E.

Put formally, for a temperature compensation member of length l, and a set of lenses of a focal length f, the two sections of the temperature compensation member are selected such that for each temperature T within the temperature range of $T_0$ and $T_1$ the change in the length of the temperature compensation member $\Delta l$ equals the change in the focal length $\Delta f$.

Consistent with some embodiments of the invention, the temperature compensation member 150 has an average thermal expansion coefficient and a length along the optical axis such that for each temperature within the specified range, an increase of the focal length is compensated by a similar increase of the length of the temperature compensation member.

Consistent with some embodiments of the invention, the optical instrument includes a sensor 140 located at the focal length of the set of lenses 112A-112E, within the bore. The sensor may be any imaging device configured for one or more spectral ranges such as visible light and IR radiation.

Consistent with some embodiments of the invention, housing 110 may be air tight or sealed so that the set of lenses is air and humidity protected. This feature may be particularly advantageous in cases in which one or more of the set of lenses 112A-112E is made of materials that are vulnerable and easily affected by humidity.

Consistent with some embodiments of the invention, optical instrument 100 includes an attaching/detaching means (not shown here) connecting the distal end of the bore to the temperature compensation member 150. The attaching/detaching means is usable or detaching the temperature compensation member for calibration purposes. For calibration purposes, housing 110, together with temperature compensation member 150 connected thereto, can be placed within a controlled oven in which the expansion of the temperature compensation member 150 is precisely measured so that the desired length may be achieved.

Consistent with some embodiments of the invention, the optical instrument includes the specified range of temperatures includes at least −60° and +60° Celsius. The optical instrument may be designed with a temperature compensation mechanism for larger or smaller temperature ranges.

Consistent with some embodiments of the invention, the bore further comprises linear bearings configured to facilitate movements of the housing within the bore along the optical axis. Advantageously the linear bearings substantially reduce the friction between the housing and the bore so that the operation of the temperature compensation mechanism disclosed herein is facilitated. This feature makes optical instrument 100 independent of the base temperature and so only changes of the temperature are considered in the aforementioned temperature compensation mechanism.

Figure 3:
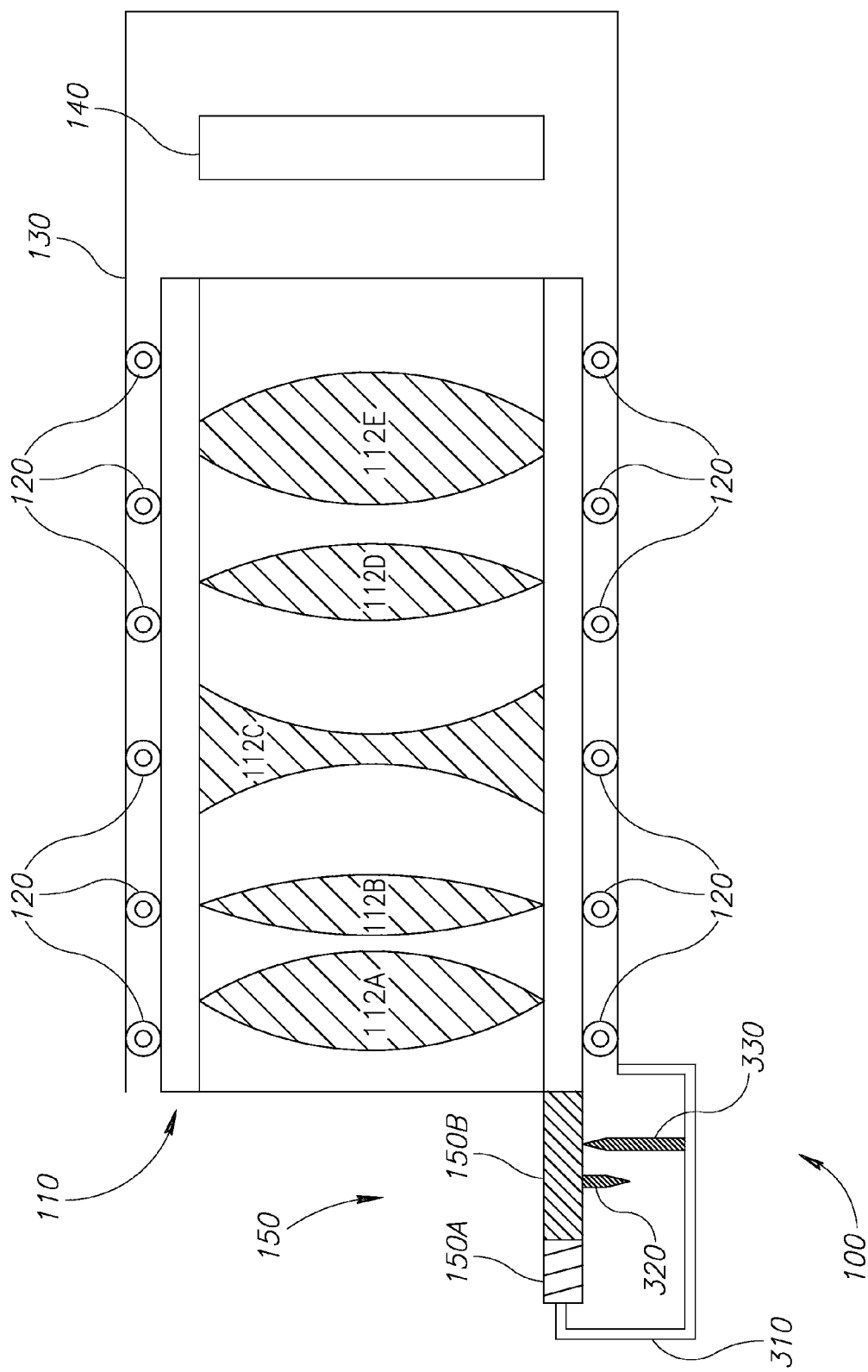
FIG. 3 is a schematic diagram illustrating yet another embodiment of the improved optical instrument according to some embodiments of the present invention.

FIG. 3 is a schematic diagram illustrating yet another embodiment of the improved optical instrument according to some embodiments of the present invention. According to this embodiment, temperature compensation member 150 is connected on one end to housing 110 which houses the lenses 112A-E and on the other hand, via a securing member 330 to bore 130. A gauge member 330 is connected to securing member 330 whereas a corresponding stopper 320 is attached to temperature compensation member 150. Both gauge member 330 and stopper 320 are located and shapes such that gauge member 330 by physical contacting stopper 320, limits the thermal expansion of temperature compensation member 150. The point from which the thermal expansion is limited as well as the direction of the limit on the thermal expansion may be determined in accordance with the specific design of the optical instrument 100.

Advantageously, limiting the thermal expansion of temperature compensation member 150 beyond a predefined threshold may be beneficial if, for example the expansion is counterproductive for the focal length compensation purposes. This may be cause, for example, due to a non-linear behavior of the focal length of lenses 112A-E as a function of the temperature. Thus, the limiting of the expansion enables to benefit from the compensation mechanism up until a point that the expansion undermines the focal length compensation.

It is understood that limiting of the expansion may be in various ways. For example: (i) it may be fully asymmetric—enabling expansion on one direction only—with no thermal expansion whatsoever on the other direction. (ii) It may limit expansion beyond a certain point on any direction or both and (iii) it may also apply some force against the expansion, for example by a spring (no shown) so as to reduce the thermal expansion but not enough to stop it altogether. The use of the abovementioned options may provide the designer of optical instrument 100 with the required degrees of freedom to optimize the focal length compensation mechanism given the practical non-linearity effects of lenses 112A-E. It is also should be noted, from a structural point of view, that gauge member 330 may be attached directly to bore 130 so that stopper 320 is limited directly by a protruding member from bore 130.

In some embodiments the stopper is attached to the temperature compensation member and may be located such as to limit the displacement of the set of lenses in at least one direction along the optical axis. The stopper may be located in a predefined location relative to the set of lenses so as to enable displacement of the set of lenses in at least one direction along the optical axis only to a certain point. The stopper may be configured to apply a force so as to reduce the displacement of the set of lenses along the optical axis.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention.

What is claimed is:

1. An optical instrument comprising:
    a housing within a bore of the optical instrument, wherein the bore and the housing have each a distal end and a proximal end;
    a set of lenses located on a common optical axis and affixed within the housing, wherein the set of lenses has a specified focal length for each specified temperature;
    a temperature compensation member connecting the distal end of the housing to the distal end of the bore of the optical instrument,
    wherein the temperature compensation member comprises one or more sections whose (i) thermal expansion coefficient and (ii) length along the optical axis are selected such that for a specified range of temperatures, the expansion of the temperature compensation member along the optical axis compensates for a change of the focal length of the set of lenses, and
    wherein said temperature compensation member is an elongated rod.

2. The optical instrument according to claim 1, wherein one section of the temperature compensation member is made of aluminum and wherein another section of the temperature compensation member is made of an amorphous thermoplastic polyetherimide material.

3. The optical instrument according to claim 1, wherein the temperature compensation member has an average thermal expansion coefficient and a length along the optical axis such that for each temperature within the specified range, a change of the focal length is compensated by an inverse change of the length of the temperature compensation member.

4. The optical instrument according to claim 1, further comprising a sensor located at the focal length of the set of lenses, within the bore.

5. The optical instrument according to claim 1, wherein the housing is sealed so that the set of lenses is air and humidity protected.

6. The optical instrument according to claim 1, wherein at least one of lenses is humidity sensitive.

7. The optical instrument according to claim 1, wherein the bore further comprises linear bearings configured to facilitate movements of the housing within the bore along the optical axis.

8. An optical instrument comprising:
    a housing within a bore of the optical instrument, wherein the bore and the housing have each a distal end and a proximal end;
    a set of lenses located on a common optical axis and affixed within the housing, wherein the set of lenses has a specified focal length for each specified temperature;
    a temperature compensation member connecting the distal end of the housing to the distal end of the bore of the optical instrument,
    wherein the temperature compensation member comprises one or more sections whose (i) thermal expansion coefficient and (ii) length along the optical axis are selected such that for a specified range of temperatures, the expansion of the temperature compensation member along the optical axis compensates for a change of the focal length of the set of lenses, and
    wherein the specified range of temperatures includes at least −20° and +20° Celsius.

9. An optical instrument comprising:
    a housing within a bore of the optical instrument, wherein the bore and the housing have each a distal end and a proximal end;
    a set of lenses located on a common optical axis and affixed within the housing, wherein the set of lenses has a specified focal length for each specified temperature;
    a temperature compensation member connecting the distal end of the housing to the distal end of the bore of the optical instrument; and
    a stopper attached to the temperature compensation member, and wherein the stopper is located such as to limit the displacement of the set of lenses in at least one direction along the optical axis,
    wherein the temperature compensation member comprises one or more sections whose (i) thermal expansion coefficient and (ii) length along the optical axis are selected such that for a specified range of temperatures, the expansion of the temperature compensation member along the optical axis compensates for a change of the focal length of the set of lenses.

10. The optical instrument according to claim 9, wherein the stopper is located in a predefined location relative to the set of lenses so as to enable displacement of the set of lenses in at least one direction along the optical axis only to a certain point.

11. The optical instrument according to claim 9, wherein the stopper is further configured to apply a force so as to reduce the displacement of the set of lenses along the optical axis.

* * * * *